April 2, 1929.  W. WAIT, JR  1,707,830
EXHAUST MUFFLER FOR RADIAL CYLINDER ENGINES OF AIRCRAFT
Filed Sept. 14, 1926
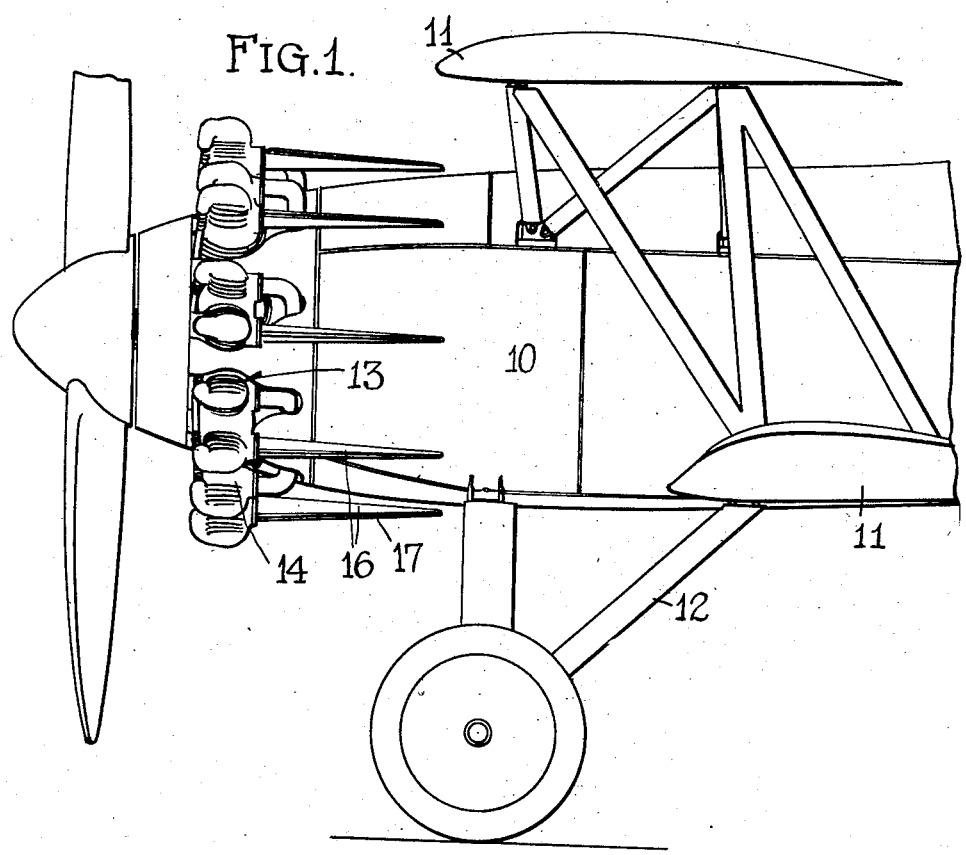
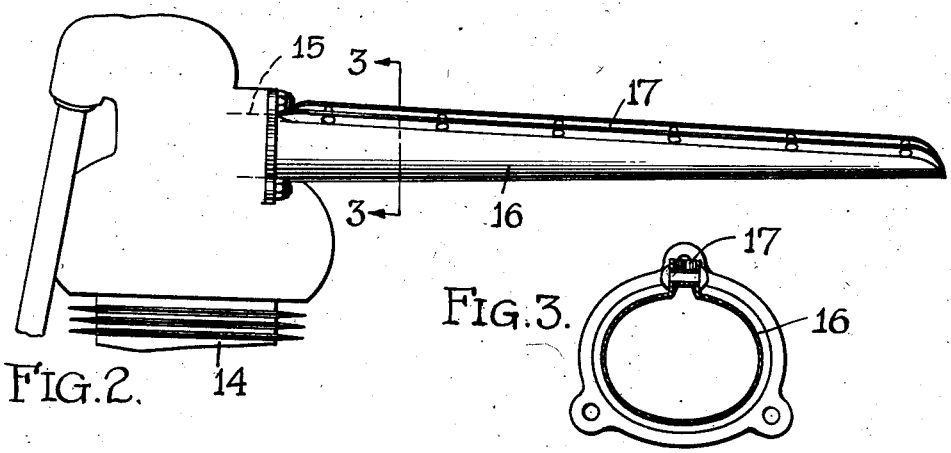
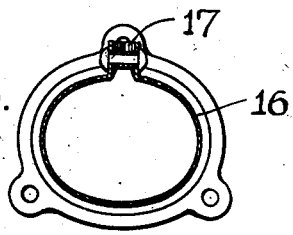
INVENTOR
WILLIAM WAIT JR.
BY
ATTORNEY Patented Apr. 2, 1929.

1,707,830

UNITED STATES PATENT OFFICE.

WILLIAM WAIT, JR., OF GARDEN CITY, NEW YORK, ASSIGNOR TO CURTISS AEROPLANE & MOTOR COMPANY, INC., A CORPORATION OF NEW YORK.

EXHAUST MUFFLER FOR RADIAL-CYLINDER ENGINES OF AIRCRAFT.

Application filed September 14, 1926. Serial No. 135,393.

My invention relates to radial cylinder engines, and especially to the radial cylinder engines of aircraft, and is concerned more particularly with means for fairing the individual cylinders thereof and for muffling the engine exhaust.

It has been the practice heretofore, in the use of radial cylinder enginges for aircraft, to so mount the engine within the fuselage or body of the machine as to admit of the projection of its cylinders radially out therefrom directly into the air stream. No attempt has been made to either streamline or fair the projecting cylinder portions or to muffle the engine exhaust. Consequently, in the use of radial cylinder engines for aircraft, the projecting cylinder portions are enormously flight resistant, and the noise of the escaping exhaust is objectionable to say the least. Moreover, since the exhaust gases are liberated directly into the atmosphere and closely adjacent to the aircraft body, a certain fire risk attends such radial cylinder engine use.

The present invention, as distinguished from the practice heretofore, is characterized by the use, in combination with a radial cylinder engine, of a plurality of exhaust mufflers, one for each engine cylinder, the mufflers, in each instance being extended rearwardly from and fastened to the engine cylinders in a manner such that the products of combustion enter directly thereinto, and being so shaped and constructed as to streamline or fair the projecting cylinder portions as well as to direct or lead the heated exhaust, in a more or less cool condition, away from the body of the machine.

Other objects and advantages of the invention will be hereinafter set forth.

In the drawings, wherein like reference characters denote like or corresponding parts, Fig. 1 is a side elevation of the forward portion of an aeroplane having installed therein a radial cylinder engine equipped with individual exhaust mufflers for each cylinder thereof;

Fig. 2 is a detail view of one of the exhaust mufflers showing its relation to one of the engine cylinders, and Fig. 3 is an enlarged section on the line 3—3 of Fig. 2.

In the embodiment of the invention selected for illustration an areoplane of more or less conventional design is shown. Such aeroplane comprises the usual fuselage or body 10, wings or supporting surfaces 11—11, and landing gear 12. Said fuselage or body 10 has mounted therein, at the forward end thereof, a radial cylinder engine 13, the cylinders 14 of which project radially out from said body directly into the air stream. Each engine cylinder at its extreme outer end has formed therein an exhaust port 15 thru which the products of combustion are discharged. Ordinarily the products of combustion or exhaust gases are liberated directly into the atmosphere, no attempt being made to either muffle the exhaust or to direct the escaping hot gases away from the body of the machine.

Notwithstanding the fact that a certain element of fire risk attends the use of radial cylinder engines for aircraft, such engines have been repeatedly and persistently used. To eliminate this fire risk and at the same time muffle the exhaust and streamline or fair the projecting cylinder portions, individual mufflers 16 are provided, one for each engine cylinder. Each individual muffler is of identical construction and each is fastened to its associated cylinder in a like manner. As illustrated in Fig. 2, wherein the detail construction of one of the individual mufflers is clearly shown, each muffler at its forward end is directly fastened to its associated engine cylinder directly over the exhaust port 15 formed therein. From said attached end, the muffler tapers rearwardly in substantially conical form and throughout its length has formed therein, at one side thereof, an attenuated slot or opening 17. A muffler thus formed and attached, not only silences the exhaust, but it directs the exhaust away from the body of the machine. Furthermore, due to its conical or tapering form, its fairs or streamlines the projecting cylinder portion to a very appreciable degree.

I am aware that a muffler of the type herein disclosed has been heretofore proposed—see U. S. Patent #1,357,992, issued November 9, 1920 and assigned to the Curtiss Aeroplane and Motor Corporation, the present assignee. Such muffler, however, like all previous mufflers used in connection with multi-cylinder engines, has associated with it an exhaust manifold thru which the products of combustion are conveyed and into which they are directly discharged. In a radial cylinder motor, however, it is entirely impractical to manifold the exhaust, and for this reason no attempt has been made to muffle the exhaust.

The advantages therefore of the present invention, over the practice heretofore, are threefold. First, by the use of individual mufflers for each cylinder of a radial cylinder engine, the objectionable noises incident to such use are adequately silenced; second, by the use of separate or individual mufflers for each engine cylinder, the projecting portions thereof are to a large extent streamlined with a resulting decrease in head resistance or drag; and third, in muffling the exhaust and liberating it laterally, rather than rearwardly as heretofore, not only is the exhaust effectively cooled, but it is directed away from the body of the machine and not parallel to it or toward it as heretofore.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. The combination, in an aircraft, of a substantially streamline body, a radial cylinder engine partially enclosed within said body and having its outer cylinder ends projecting radially out therefrom directly into the air stream, each said cylinder having formed therein an exhaust port, and a fairing piece for each cylinder fastened thereto directly over said exhaust port and into which the products of combustion are discharged.

2. The combination in an aircraft, of a body, a radial cylinder engine partially enclosed within said body and having its outer cylinder ends projecting radially out therefrom directly into the air stream, each said cylinder having formed therein an exhaust port, and a rearwardly tapering hollow fairing piece for each individual cylinder fastened thereto directly over said exhaust port and into which the products of combustion are discharged.

3. The combination, in an aircraft, of a body, a radial cylinder engine partially enclosed within said body and having its outer cylinder ends projecting radially out therefrom directly into the air stream, each said cylinder having formed therein an exhaust port, and a longitudinally slotted rearwardly tapering muffler for each individual cylinder fastened thereto directly over said exhaust port and into which the products of combustion are discharged, said mufflers, in each instance, acting also as a fairing piece for the projecting portions of the engine cylinders which they serve.

In testimony whereof I hereunto affix my signature.

WILLIAM WAIT, Jr.